(12) United States Patent
Bahng

(10) Patent No.: US 7,301,867 B2
(45) Date of Patent: Nov. 27, 2007

(54) METHOD AND APPARATUS FOR CHANGING A RECORDING SPEED OF A DISK DEVICE

(75) Inventor: Keuk Young Bahng, Osan-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 582 days.

(21) Appl. No.: 10/348,908

(22) Filed: Jan. 23, 2003

(65) Prior Publication Data

US 2004/0001406 A1    Jan. 1, 2004

(30) Foreign Application Priority Data

Jun. 26, 2002    (KR) .................. 10-2002-0035885

(51) Int. Cl.
G11B 7/00    (2006.01)
(52) U.S. Cl. .................. 369/47.38; 369/47.46; 369/53.3
(58) Field of Classification Search ........... 369/47.39, 369/47.41, 47.46, 53.31; 386/46, 83, 125–126
See application file for complete search history.

(56) References Cited

U.S. PATENT DOCUMENTS

| | | | | |
|---|---|---|---|---|
| 5,189,412 A | * | 2/1993 | Mehta et al. | 340/825.22 |
| 5,982,570 A | * | 11/1999 | Koizumi et al. | 369/53.42 |
| 6,111,826 A | * | 8/2000 | Minase | 369/53.18 |
| 6,578,106 B1 | * | 6/2003 | Price | 360/69 |
| 6,678,229 B1 | * | 1/2004 | James | 369/47.36 |
| 6,989,953 B1 | * | 1/2006 | Codilian | 360/73.03 |
| 6,996,046 B2 | * | 2/2006 | Ono et al. | 369/53.31 |
| 2006/0114757 A1 | * | 6/2006 | Theimer et al. | 369/30.01 |

* cited by examiner

Primary Examiner—Thang V. Tran
Assistant Examiner—Nathan Danielsen
(74) Attorney, Agent, or Firm—Ked & Associates, LLP

(57) ABSTRACT

The present invention relates to a recording speed determining method of a disk device. The present method, when data record is requested from a host through an interface, a disk device can receive size information about data to be recorded and/or the present time from the host, and determine a recording speed of a disk to be suitable for the received size information and/or for a time zone where the device is located. The disk device can determine such data size and time zone information internally. Thus, it is possible to reduce a noise that is caused from disk rotation if the size of data to be recorded is small or when a noise is felt relatively big. Further, it is possible to determine a data recording speed in accordance with a data size.

23 Claims, 2 Drawing Sheets

| Range of Data Size | Recording Speed | RPM |
|---|---|---|
| over 700Mbytes | 8X | 8000 |
| 700M ~ 400M | 4X | 4000 |
| 400M ~ 100M | 2X | 2000 |
| below 100Mbytes | 1X | 1000 |

*Note : 'X' means a basic speed of 150Kbits/s*

METHOD AND APPARATUS FOR CHANGING A RECORDING SPEED OF A DISK DEVICE

BACKGROUND OF THE INVENTION

1. Field of the Invention

The present invention relates to a disk device.

2. Background of the Related Art

In general, a disk device can read or write data to/from a compact disk (called 'CD'), a digital versatile disk (called 'DVD'), or a high-density DVD (called 'HD-DVD'). As technologies of compressing and transmitting video/audio data develops, performance of a disk device improves.

A disk device generally writes data received from a host such as a PC onto a writable optical disk. To prevent possible damage of a writable disk, a disk device conducts a continuous writing operation at a constant speed without servicing any interrupt during the writing operation.

A default maximum recording speed of a disk device is set in its manufacturing process. Owing to developments of a servo mechanism and laser technology, for example, a default recording speed has been increased up to 1800 kbits/s.

Further, to shorten a data recording time, a disk device also tends to increase a rotation speed of a writable disk. For example, a spindle motor to drive a placed disk rotates at about 10,000 RPM.

The above references are incorporated by reference herein where appropriate for appropriate teachings of additional or alternative details, features and/or technical background.

SUMMARY OF THE INVENTION

An object of the present invention is to solve at least the above problems and/or disadvantages of the related art and to provide at least the advantages described hereinafter.

Another object of the present invention is to provide a recording speed changing method and apparatus that adjusts a recording speed according to a size of data to be recorded.

Another object of the present invention is to provide a recording speed changing method and apparatus that adjusts a recording speed of data to be recorded according to a size of data to be recorded onto a recordable disk.

Another object of the present invention is to provide a recording speed changing method and apparatus that adjusts a recording speed of a data to be recorded according to a time-of-day.

Another object of the present invention to provide a recording speed changing method of a disk device that reduces a recording speed to reduce noise based on a time zone in which the disk drive is located.

To achieve at least the above objects and other advantages in a whole or in part and in accordance with the purpose of the present invention, as embodied and broadly described herein, there is provided a method including detecting size of data to be recorded and determining a recording speed based on the detected size.

To further achieve at least the above objects and other advantages in a whole or in part and in accordance with the purpose of the present invention, as embodied and broadly described herein, there is provided a method including detecting a time-of-day of an optical disk device where data is to be recorded, determining a data recording speed suitable to the detected time-of-day with reference to a prescribed relationship of the time-of-day with a plurality of data recording speeds and controlling a servo mechanism of the disk device based on the determined data recording speed.

To further achieve at least the above objects and other advantages in a whole or in part and in accordance with the purpose of the present invention, as embodied and broadly described herein, there is provided a data recording apparatus including a controller that receives data to be recorded, wherein the controller detects a time-of-day of a disk device where the data is to be recorded and determines a rotational speed suitable to the detected time-of-day with reference to a prescribed relationship of the time-of-day with a plurality of rotational speeds and a servo unit that rotates according to the determined rotational speed.

To further achieve at least the above objects and other advantages in a whole or in part and in accordance with the purpose of the present invention, as embodied and broadly described herein, there is provided a data recording apparatus including a host computer and a disk device coupled to the host that includes a controller that receives a size information of data to be recorded and determines a rotational speed based on the received size information and a servo unit that rotates at the rotational speed determined by said controller.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

As described above, it was determined that related art disk drives have various disadvantages. When data recording is requested, a disk device conducts a writing operation at its default maximum recording speed. That is, a disk is rotated at a highest rotational speed corresponding to the maximum recording speed by a spindle motor regardless of data size to be recorded. Further, a rotational noise and heat generated by a motor are proportional to its rotation speed. Such a rotational noise is not a problem at day or at a noisy place, however, it is a big problem at night or at a very quiet place. Preferred embodiments in accordance with the present invention are intended to independently and in combination resolve or reduce such disadvantages.

Figures 1, 2:
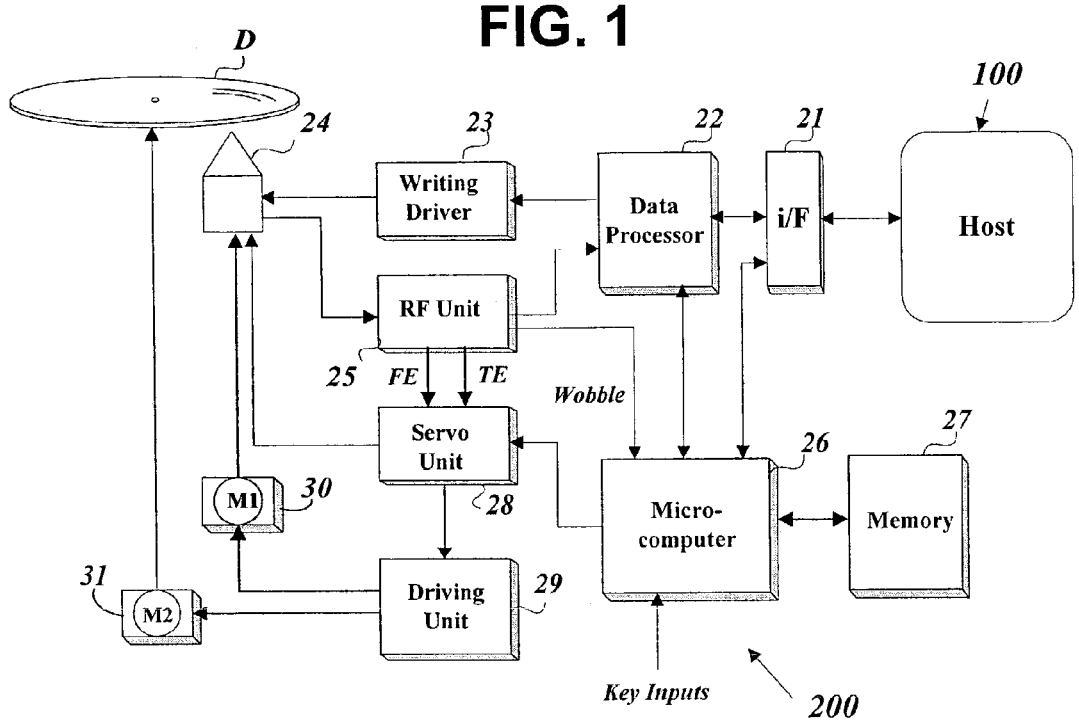
FIG. 1 is a block diagram that shows a preferred embodiment of an apparatus in accordance with the present invention.
FIG. 2 is an illustrative table to relate several recording speed ranges with respective data size.

FIG. 1 is a simplified block diagram that shows a preferred embodiment of an apparatus in accordance with the present invention. As shown in FIG. 1, the apparatus can be an optical disk device 200, but the present invention is not intended to be so limited.

The disk device of FIG. 1 can include an optical pickup 24 for writing signals onto a surface of a writable disk D using an equipped laser diode (not shown) and for reading written signals from the surface of the disk D, and a writing driver 23 applying a writing current to the optical pickup 24. An interface 21 can send/receive data to/from a host 100 such as a PC according to AT Attached Packet Interface (ATAPI) protocol or the like. A data processor 22 can sequentially store input data from the host 100 in an internal buffer and convert the stored data to a bit train of record-suitable format and process the signals detected from the disk D to restore original data. Alternatively, data could be previously stored or generated within the disk device. An RF unit 25 can filter and binarize signals detected by the pickup 24 and detect a wobble signal from the detected signals. A microcomputer 26 can control an overall recording/reproducing operation including adjustment of data converting speed of the data processor 22 based on the detected wobble signal.

As shown in FIG. 1, a memory 27 is for storing temporary data produced by the microcomputer 26 and storing a table or the like preferably relating data size vs. recording speed. Preferably, a sled motor 30 is for moving the pickup 24 radially, a spindle motor 31 is for rotating the placed disk D and a driving unit 29 is for separately driving the sled motor 30 and the spindle motor 31. A servo unit 28 can conduct tracking/focusing operation for an objective lens in the optical pickup 24 and control the driving unit 29 under the control of the microcomputer 26.

Operations of the disk device 200 as shown in FIG. 1 will now be described. In the preferred embodiment of the disk device 200, when a data record command is received together with size information of data to be recorded, the microcomputer 26 can search a prescribed relationship, for example, stored in the memory for the appropriate recording speed. Such size information can be input, determined or received from the host 100 with the data. Thus, the microcomputer 26 can search a table or a defined function in the memory 27 for a size range corresponding to the received size information, and it controls the servo unit 28 based on a recording speed linked with the determined or searched size range. An exemplary set of information is provided as shown in FIG. 2, and could be stored as a table in the memory 27. Then, the servo unit 28 preferably applies a signal to the driving unit 29 to set or change a rotational speed of the disk D.

Assume the table in the memory 27 is given as shown in FIG. 2. When the size information is indicative of over 700 Mbytes, the rotational speed of the spindle motor 31 is preferably set or changed such that the recording speed is 8X (e.g., 'X' means a basic speed, namely 150 Kbits/s). In this case, 8X (=1200 Kbits/s) is the highest recording speed of the disk device. In the same manner, 4X for the range between 400 and 700 Mbytes, 2X for between 100 and 400 Mbytes, and 1X for below 100 Mbytes can each be determined as a recording speed, respectively.

FIG. 2 is only an illustrative table relating data size with recording speed. Since magnitude of an actual noise can be primarily dependent on a rotational speed of a motor, a reference table such as FIG. 2 can also be constructed to relate data size with rotation speed (RPM) of a spindle motor instead of recording speed.

In the exemplary description of setting/changing the rotational speed, data recording speed and rotational speed (e.g., RPM) were described. As such, preferred embodiments according to the present invention can be applicable to a constant linear velocity (CLV) or a constant angular velocity (CAV) determination. A motor driving speed changes in accordance with the CLV of the data recording speed and a data writing speed changes with the CAV for each rotational speed.

In addition, various users experience the same loudness subjectively or differently. Accordingly, it is preferable that the pre-made table of data size vs. recording (e.g., rotational) speed can be changed or reset by a user's request.

The data to be recorded can be sequentially stored in the internal buffer of the data processor 22 and then converted to a bit train having a record-suitable format by the data processor 22. The writing driver 23 preferably applies a writing current corresponding to the bit train to the optical pickup 24 that forms mark/space patterns onto the disk D by radiating a laser beam according to the writing current.

Figure 3:
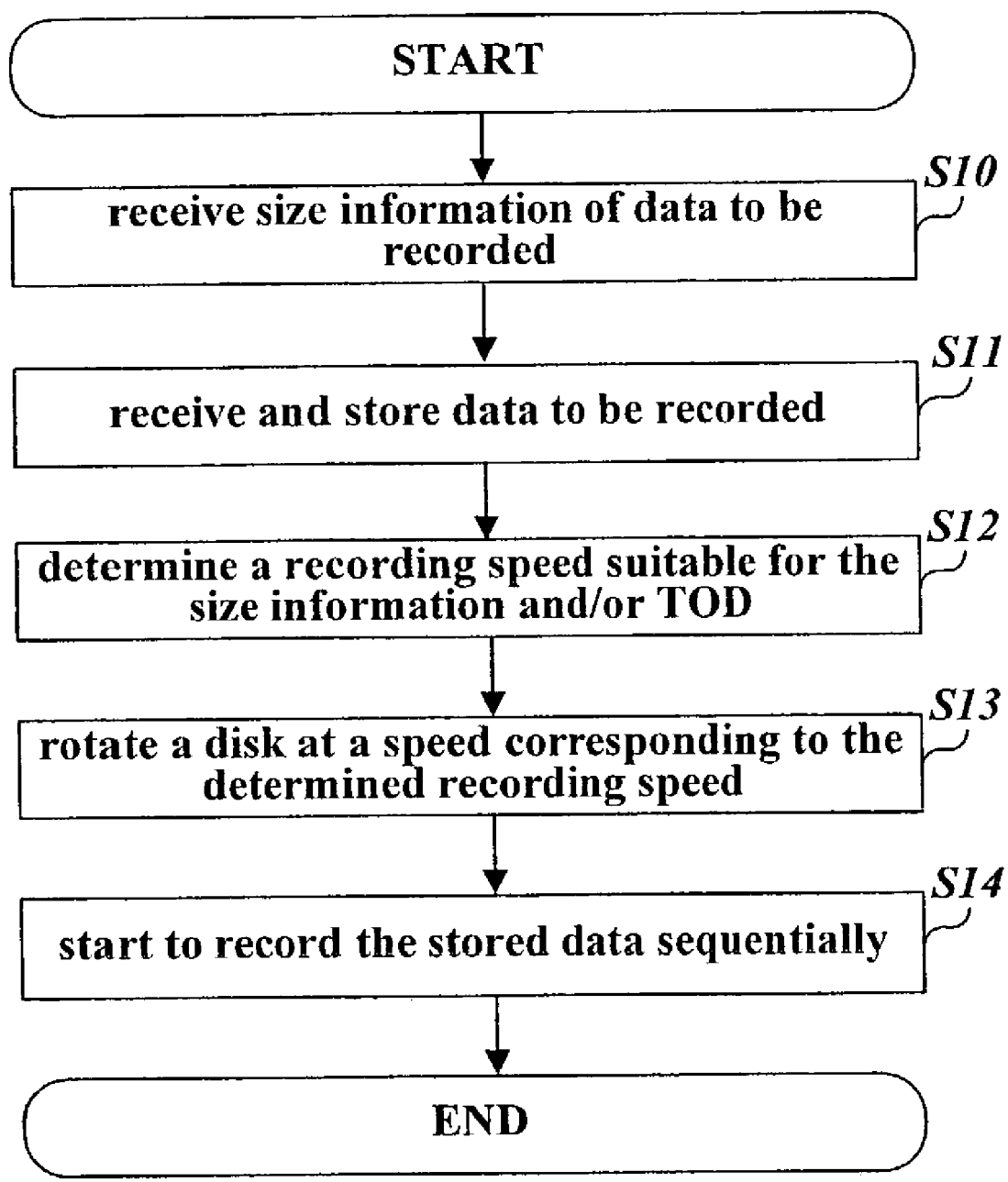
FIG. 3 is a flow chart that shows a preferred embodiment of a method to change a recording speed in accordance with the present invention.

FIG. 3 is a flowchart that shows a preferred embodiment of a method for controlling a data recording speed in accordance with the present invention. The method of FIG. 3 can be incorporated in and will be described with reference to the apparatus of FIG. 1. However, the present invention is not intended to be so limited.

After a process starts as shown in FIG. 3, the host 100 can calculate the size of data selected to be written onto an inserted disk when data recording is requested, such as requested from a user. The host 100 preferably sends a write command to the disk device 200 along with information on the calculated data size in a form of pre-defined command format between the host 100 and the disk device 200. After acknowledgement of the write command from the disk device 200, the host 100 starts to send data to the disk device 200. Alternatively, the disk device 200 could determine and/or store the data size with the intended data.

Meanwhile, if the data size is received from the host 100 along with the write command (step S10), the microcomputer 26 preferably acknowledges the reception of the write command first, and then it searches the table of data size vs. recording or rotational speed stored in the memory 27 for a size range including the received data size. If data is received from the host 100 during or after the search operation, the data can be sequentially stored in the buffer of the data processor 22 (step S11).

If the size range is determined, the microcomputer 26 can read a recording (or rotational) speed linked with the determined (e.g., found) range (step S12). The microcomputer 26 sends control data associated the read speed to the servo unit 28. The servo unit 28 applies a driving signal corresponding to the received control data to the driving unit 29 that drives the spindle motor 31 to rotate the placed disk D at the read rotational speed or at a rotational speed corresponding to the read recording speed (step S13). The microcomputer 26 also can control the driving unit 29 through the servo unit 28 to move the optical pickup 24 to a recording position on the disk D.

After completion of speed changing or setting, the data processor 22 reads the stored data from the internal buffer sequentially to convert it to a bit train. The writing driver 23 applies a writing current corresponding to the bit train from the data processor 22 to a laser diode equipped in the optical pickup 24 that radiates a laser beam according to the writing current to form mark/space patterns onto the disk D (step S14).

In addition, even though a rotational speed is same, users feels a noise caused from a rotating a motor differently at day and at night. Namely, a user feels a noise generated at night relatively bigger.

Thus, data recording speed in step S12 may be adjusted according to a time zone in which the present time (e.g., user) belongs or the time zone in which the device is located. When data record is requested, the present time (i.e., time-of-day) is preferably received from the host 100 first and it is determined in which time zone the present time belongs. If the determined time zone is included in a certain range, e.g., from 11:00 P.M. to 5:00 A.M., the default maximum speed or a selected speed from the table is reset to a predetermined lower recording (or rotational) speed before recording of input data begins in order to reduce noise. Alternatively, if the determined time zone is in the certain range, a prescribed level (e.g., 2X) can be used that will reduce noise.

The above-described method of decreasing a recording (e.g., rotational) speed based on a time zone shown in FIG. 3 may be conducted together with the recording speed adjusting method based on the size of data to be recorded. In case that the two methods are all used, the time-zone-based method is preferably conducted first. That is, first, the present time when the data recording is requested is checked and a recording (rotational) speed is reduced if the present time is within a predetermined time zone, and if the recording speed is not adjusted by the time-of-day, it can be adjusted according to the size of data to be recorded as described before. Alternatively, the time-of-day data recording speed adjusting can be used to set a maximum rate or speed, and then the data recording speed adjustment can be varied as described above within that range based on a size of the data to be recorded. However, the time-zone-based method can be combined with the speed adjusting method based on size of data performed first, or both methods can be sequentially performed in a certain order.

The above-described preferred embodiments of methods and apparatus can set recording (e.g., rotational) speed automatically based on data size and/or time zone. However, it is also possible to set recording (rotational) speed manually according to user's command.

For example, if a user feels or determines noise remains too large after requesting data recording, he or she can command the host 100 to reduce a current recording (rotational) speed. Then, the microcomputer 26 of the disk device 200 changes recording to a predetermined lower recording (rotational) speed or reduces a current recording (rotational) speed by a predetermined step. Consequently, the disk device 200 can respond to user's noise-reduction request immediately.

The above-described preferred embodiments are for data recording, however, they could be modified applicable to data reproduction (e.g., read for copy). Namely, a reproducing (read) speed or a rotational speed can be set according to the size of data to be reproduced (or read) or can be reduced based on whether the present time belongs to a certain time zone or not.

As described above, preferred embodiments of recording speed changing methods and apparatus of a disk device can control data recording based on prescribed criteria, reduce a noise caused by a rotating motor and can suppress a heat generated by a spindle motor.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method, comprising:
   detecting size of data to be recorded by receiving information about the size of the data from a host; and
   determining a recording speed based on the detected size, wherein the determining the recording speed comprises:
   providing a plurality of relationships each relating a plurality of data sizes to be recorded with a plurality of recording speeds,
   selecting one relationship among the plurality of relationships using a current time-of-day at an optical disk device, and
   identifying the recording speed with reference to the selected relationship and the detected size of data size to be recorded.

2. The method of claim 1, wherein the detecting the size of data and the determining the recording speed is performed in a disk device.

3. The method of claim 1, further comprising controlling a rotational speed based on the determined recording speed.

4. The method of claim 1, wherein the determining the recording speed increases the recording speed as the data size increases, and wherein the data recording speeds include X, 2X, 4X and 8X, where X is a prescribed speed of bits per second.

5. The method of claim 1, wherein the determining the recording speed decreases the recording speed to reduce a noise that is caused from disk rotation in a disk device.

6. The method of claim 5, further comprising determining the current time-of-day at the optical disk device, and wherein the determining the recording speed is based on the time-of day by using the time-of-day to set a maximum recording speed of the preset relationship or using the time-of-day to provide the recording speed.

7. The method of claim 5, wherein the recording speed can be set by a user's request, and wherein the user's request can select one of a plurality of data recording speeds, modify the plurality of data speeds or add to the plurality of data speeds.

8. A method, comprising:
   receiving information from a host regarding a size of data to be recorded;
   detecting a time-of-day of an optical disk device where data is to be recorded;
   determining a data recording speed suitable to the detected time-of-day with reference to a prescribed relationship of the time-of-day with a plurality of data recording speeds and further based on the received information regarding the size of data to be recorded; and
   controlling a servo mechanism of the optical disk device based on the determined data recording speed.

9. The method of claim 8, wherein each of the plurality of data recording speeds corresponds to a rotational speed for a motor or a data writing speed, wherein the data writing speeds are determined by substantially constant linear velocity (CLV), and wherein the rotational speeds are determined by substantially constant angular velocity (CAV).

10. The method of claim 8, wherein the determining the data recording speed decreases the recording speed when the time-of-day is nighttime.

11. The method of claim 10, wherein the determining the recording speed decreases the recording speed to reduce a noise that is caused from data recording including a servo mechanism and disk rotation.

12. The method of claim 10, wherein the nighttime is at least one of determined by a user and between 10 PM and 6 AM.

13. The method of claim 8, wherein the determining the data recording speed suitable to the detected time-of-day sets an upper limit, and wherein the determining the data recording speed includes one of the plurality of data recording speeds under the upper limit.

14. The method of claim 8, wherein said determining the data recording speed suitable to the detected time-of-day comprises:
   identifying a plurality of recording speed to data size relations, wherein each relation assigns one of a plurality of data recording speeds to two or more data sizes for recordable data;
   selecting among the recording speed to data size relations according to the time-of-day of the disk device and user actions to set the prescribed relationship;
   operating the disk device to record data; and
   changing the selected relationship to change the prescribed relationship by re-selecting a different relationship of the relationships in accordance with a detected time-of-day.

15. The method of claim 14, wherein said changing the selected relationship comprises setting to a prescribed speed or selecting a reduced maximum speed for the two or more data sizes.

16. A data recording apparatus, comprising:
   a controller that receives data to be recorded, wherein the controller detects a time-of-day of a disk device where the data is to be recorded and determines a rotational speed suitable to the detected time-of-day with reference to a prescribed relationship of the time-of-day with a plurality of rotational speeds;
   a servo unit that rotates according to the determined rotational speed; and
   a host coupled to the disk device to provide information to the controller regarding a size of data to be recorded, wherein the disk device includes the controller and the disk device includes a storage device that stores a set of information that relates to the received information regarding the size of data to be recorded with recording speed, and wherein said controller selects one of a plurality of recording speeds suitable to the received size using said set of information.

17. The apparatus of claim 16, wherein said controller increases the recording speed as the size of data to be recorded increases, and wherein the controller decreases the recording speed when the time-of-day is nighttime.

18. The apparatus of claim 16, wherein said controller decreases the rotational speed to reduce a noise that is caused by the data recording, and wherein the recording speed can be set by a user's request.

19. A data recording system, comprising:
   a host computer; and
   a disk device coupled to the host computer that comprises:
      a controller that receives a size information of data to be recorded from the host computer and determines a rotational speed based on the received size information, and
      a servo unit that rotates at the rotational speed determined by said controller,
   wherein said controller is configured to provide a plurality of relationships each relating a plurality of data sizes to be recorded with a plurality of recording speeds and to select among the plurality of relationships using a current time-of-day and the detected data size.

20. The system of claim 19, wherein said controller increases the recording speed as the data size increases.

21. The system of claim 20, wherein the controller determines said current time-of-day at the disk device, wherein the controller determines the rotational speed based on the time-of-day, and wherein the controller decreases the rotational speed to reduce a noise that is caused by data recording operations when the time-of-day is nighttime.

22. The system of claim 21, wherein the controller comprises means for adjusting a data recording speed.

23. The system of claim 19, wherein the controller is configured to select among the plurality of recording speeds in the selected relationship using the detected data size, and wherein the controller is configured to modify the selected relationship using said current time-of-day.

* * * * *